United States Patent
Goldberg et al.

(10) Patent No.: US 9,146,685 B2
(45) Date of Patent: Sep. 29, 2015

(54) MARKING LOCAL REGIONS AND PROVIDING A SNAPSHOT THEREOF FOR ASYNCHRONOUS MIRRORING

(71) Applicant: INTERNATIONAL BUSINESS MACHINES CORPORATION, Armonk, NY (US)

(72) Inventors: Itzhack Goldberg, Hadera (IL); Michael Keller, Tel Aviv (IL); Moriel Lechtman, Haifa (IL); Orit Nissan-Messing, Hod HaSharon (IL); Eliyahu Weissbrem, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

(21) Appl. No.: 13/764,031

(22) Filed: Feb. 11, 2013

(65) Prior Publication Data

US 2014/0229692 A1 Aug. 14, 2014

(51) Int. Cl.
G06F 13/00 (2006.01)
G06F 3/06 (2006.01)
G06F 11/14 (2006.01)
G06F 11/20 (2006.01)

(52) U.S. Cl.
CPC .............. *G06F 3/0614* (2013.01); *G06F 3/065* (2013.01); *G06F 3/067* (2013.01); *G06F 11/14* (2013.01); *G06F 11/1451* (2013.01); *G06F 11/2064* (2013.01); *G06F 11/1469* (2013.01); *G06F 11/2069* (2013.01); *G06F 11/2074* (2013.01); *G06F 11/2082* (2013.01); *G06F 2201/84* (2013.01)

(58) Field of Classification Search
CPC ............ G06F 11/2074; G06F 11/2082; G06F 11/1469; G06F 11/2064; G06F 11/2069; G06F 2201/84; G06F 11/1451
USPC .................. 707/619, 613, 649, 610; 711/162
See application file for complete search history.

(56) References Cited

U.S. PATENT DOCUMENTS

| | | | |
|---|---|---|---|
| 7,725,668 B2 | 5/2010 | Akutsu et al. | |
| 7,979,651 B1 | 7/2011 | Ramanathan et al. | |
| 2003/0126107 A1* | 7/2003 | Yamagami | 707/1 |
| 2003/0167380 A1* | 9/2003 | Green et al. | 711/136 |
| 2005/0216462 A1* | 9/2005 | Xiao | 707/8 |
| 2007/0168518 A1* | 7/2007 | McCabe et al. | 709/226 |
| 2010/0229047 A1* | 9/2010 | Mikami | 714/46 |
| 2013/0191337 A1* | 7/2013 | Goldberg | 707/634 |
| 2013/0191606 A1* | 7/2013 | Goldberg | 711/162 |
| 2014/0201480 A1* | 7/2014 | Factor et al. | 711/162 |

* cited by examiner

*Primary Examiner* — Hong Kim
(74) *Attorney, Agent, or Firm* — Griffiths & Seaton PLLC

(57) ABSTRACT

Methods, apparatus and computer program products implement embodiments of the present invention that include conveying first data from local regions of a local volume of a local storage system to a remote storage system having a remote volume with remote regions in a one-to-one correspondence with the local regions. While conveying the first data, a request is received to update a given local region, and the given local region is marked. Subsequent to conveying the first data, a local snapshot referencing the local regions is created, and second data is conveyed from the marked local region to the remote storage system.

20 Claims, 3 Drawing Sheets

US 9,146,685 B2

MARKING LOCAL REGIONS AND PROVIDING A SNAPSHOT THEREOF FOR ASYNCHRONOUS MIRRORING

FIELD OF THE INVENTION

The present invention relates generally to data storage, and specifically to initializing a remote volume for asynchronous mirroring.

BACKGROUND

Snapshots and mirroring are among the techniques employed by data storage facilities for disaster recovery planning. A snapshot may be a copy of data residing on a storage volume that is created at a particular point in time. Since a full backup of a large data set can take a long time to complete, a snapshot may define the dataset to be backed up. Data associated with the snapshot is static, and is therefore protected from any subsequent changes to the data on the volume.

Mirroring replicates a local storage volume to a separate remote storage volume, in order to ensure redundancy. For a storage facility comprising the local and the remote storage volumes, mirroring can be implemented either synchronously or asynchronously. During synchronous mirroring, a host (e.g., a database server) communicating with the storage facility receives a write acknowledgement after data is successfully written to both the local and the remote storage volumes. Synchronous mirroring is typically implemented over a high speed local area network (LAN) or a wide area network (WAN).

During asynchronous mirroring, the host receives the write acknowledgement after the data is written to the local volume (i.e., the remote volume may have not yet received the data and/or may not have acknowledged writing the data). Asynchronous mirroring is typically implemented over lower speed wide area networks, especially over greater distances.

Asynchronous mirroring can be implemented using snapshot-based synchronization. During snapshot-based synchronization, a most recent snapshot (MRS) is defined and compared it to a last replicated snapshot (LRS). Any differences detected when comparing the MRS to the LRS are then conveyed to the remote volume. Upon conveying the differences, the LRS is deleted and the MRS becomes the new LRS. Therefore, snapshots defined during snapshot-based synchronization can be marked as "short-lived", since the MRS and LRS are typically retained for short time periods.

The description above is presented as a general overview of related art in this field and should not be construed as an admission that any of the information it contains constitutes prior art against the present patent application.

SUMMARY

There is provided, in accordance with an embodiment of the present invention a method, including conveying first data from local regions of a local volume of a local storage system to a remote storage system having a remote volume with remote regions in a one-to-one correspondence with the local regions, receiving, while conveying the first data, a request to update a given local region, and marking the given local region, creating, subsequent to conveying the first data, a local snapshot referencing the local regions, and subsequent to creating the local snapshot, conveying second data from the marked local region to the remote storage system.

There is also provided, in accordance with an embodiment of the present invention a storage system, including a local volume having local regions, a remote volume having remote regions in a one-to-one correspondence with the local regions, and a local processor configured to convey first data from the local regions to the corresponding remote regions, to receive, while conveying the first data, a request to update a given local region, and to mark the given local region, to create, subsequent to conveying the first data, a local snapshot referencing the local regions and to convey, subsequent to creating the local snapshot, second data from the marked local region to the remote storage system.

There is further provided, in accordance with an embodiment of the present invention a computer program product, the computer program product including a non-transitory computer readable storage medium having computer readable program code embodied therewith, the computer readable program code including computer readable program code configured to convey first data from local regions of a local volume of a local storage system to a remote storage system having a remote volume with remote regions in a one-to-one correspondence with the local regions, computer readable program code configured to receive, while conveying the first data, a request to update a given local region, and to mark the given local region, computer readable program code configured to create, subsequent to conveying the first data, a local snapshot referencing the local regions, and computer readable program code configured to convey, subsequent to creating the local snapshot, second data from the marked local region to the remote storage system.

BRIEF DESCRIPTION OF THE DRAWINGS

The disclosure is herein described, by way of example only, with reference to the accompanying drawings, wherein.

DETAILED DESCRIPTION OF EMBODIMENTS

Prior to asynchronously mirroring a local volume on a local storage system to a remote volume on a remote storage system, data on the local and the remote volumes must be initially synchronized (i.e., the data must be consistent). In addition to an initial synchronization, there may be instances when the local and remote volumes need to be resynchronized. For example, if a communication link between the local and remote volume fails for a specific period of time (e.g., a few hours), then data on the local and remote volumes must be resynchronized before resuming the asynchronous mirroring.

Embodiments of the present invention provide methods and systems for a local storage system to use a delayed snapshot (also known as a tardy snapshot) while initializing a remote volume for asynchronous mirroring. In some embodiments, the local storage system first conveys data from local regions on the local volume to corresponding remote regions on the remote volume, while at the same time marking (i.e., keeping track) of any local regions that have been updated. In some embodiments, as explained hereinbelow, the local storage system may keep track of the updated local regions via a bitmap.

Upon completing conveying data from the local regions to the remote regions, the local storage controller can create a local snapshot, thereby retaining the local volume at a consistent state. To complete the synchronization the local storage controller can then convey the marked regions to the remote volume.

Retaining snapshots on a storage system can be expensive from a resource perspective. By delaying the creation of the local snapshot (i.e., until after data from the local regions is conveyed to the remote regions), embodiments of the present invention can significantly reduce the retention time of the snapshot, when compared to other synchronization methods where the snapshot is created at the beginning of the synchronization process (i.e., an "early" snapshot).

Figure 1:
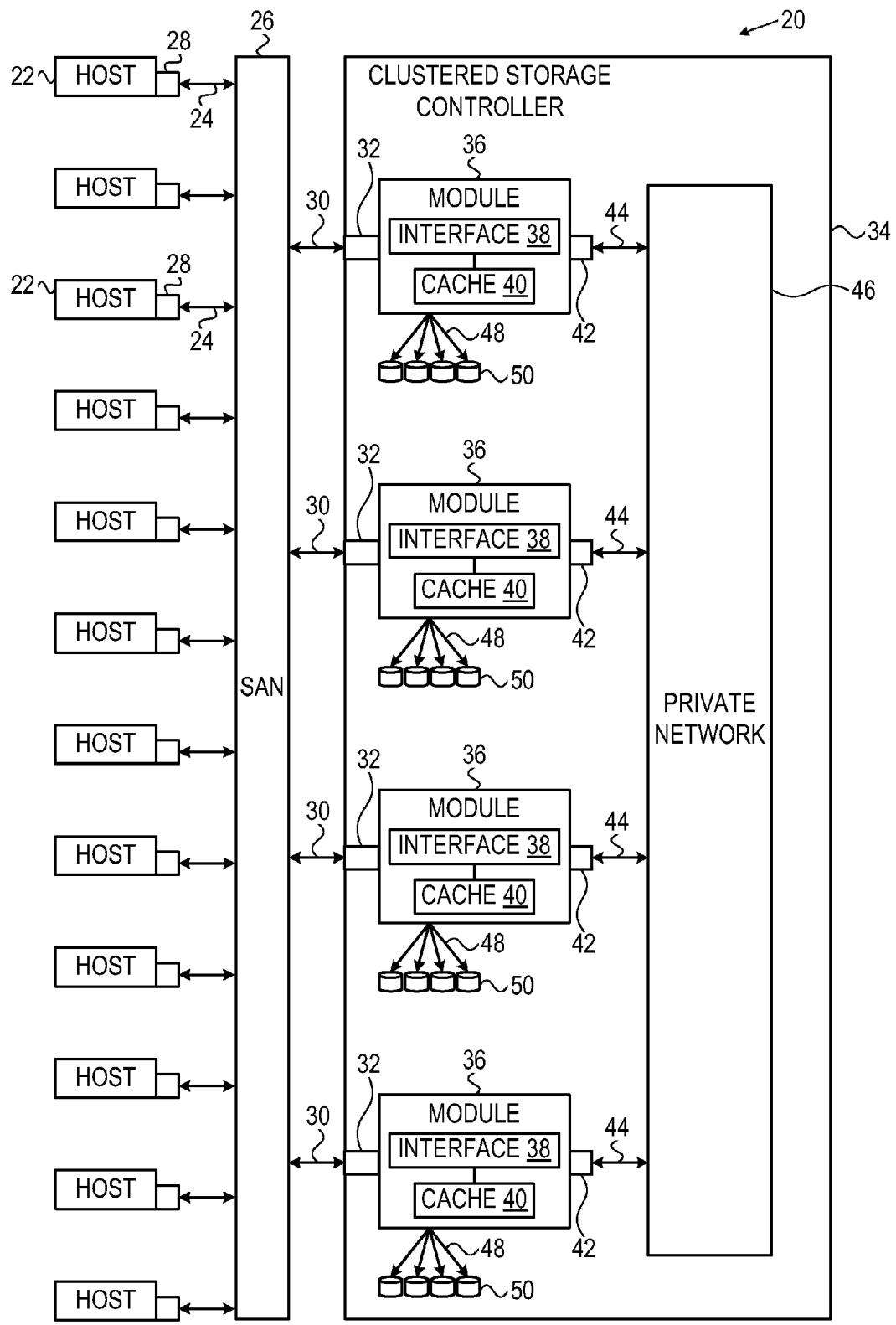
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
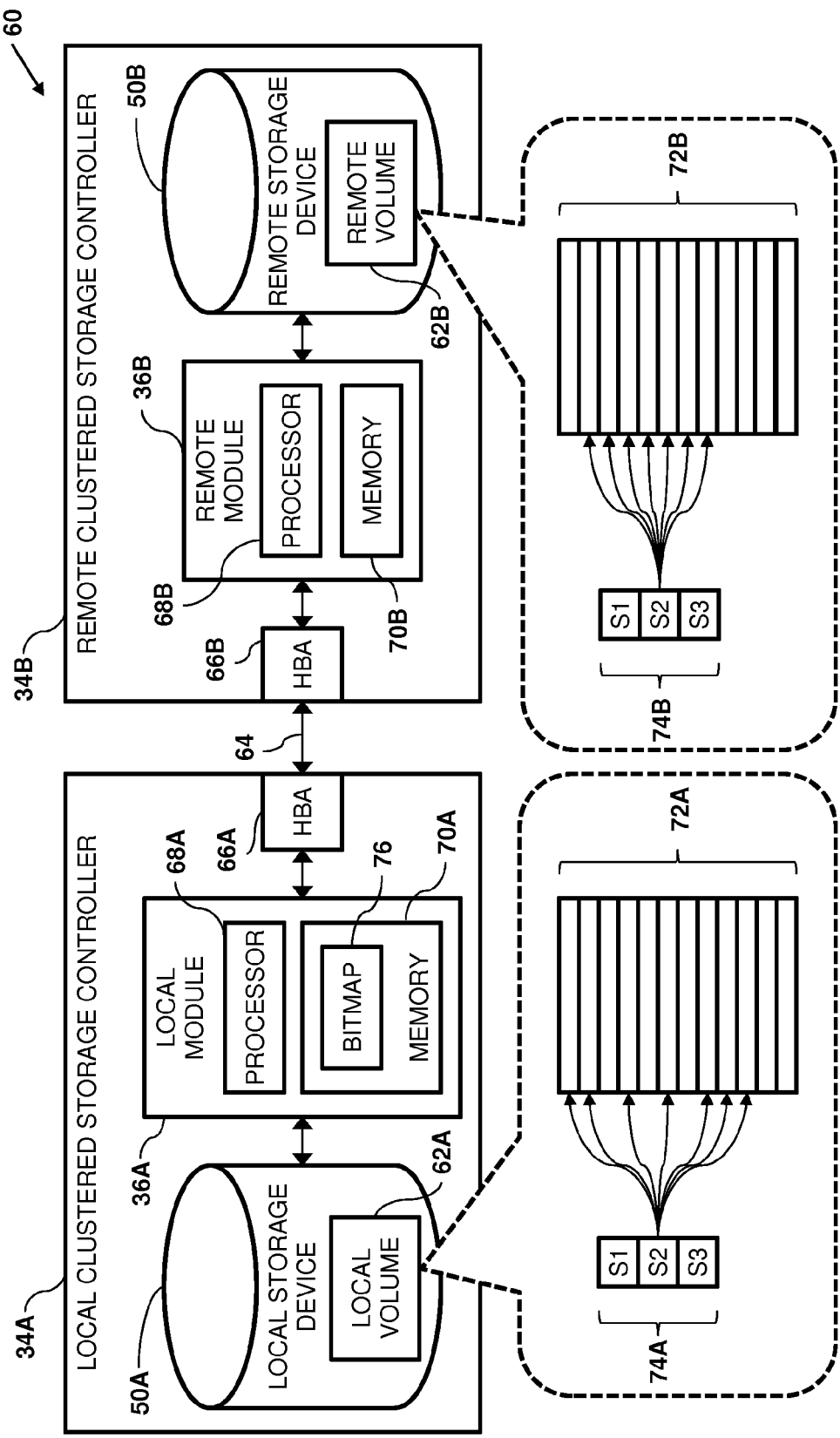
FIG. 2 is a schematic pictorial illustration of a remote mirror initialization and synchronization facility, in accordance with an embodiment of the present invention.

FIG. 2 is a block diagram that schematically illustrates a remote mirror initialization and synchronization facility 60, in accordance with a disclosed embodiment of the present invention. In the description herein, clustered storage controllers 34 and their respective components may be differentiated by appending a letter to the identifying numeral, so that clustered storage controllers 34 comprise a local clustered storage controller 34A and a remote storage controller 34B.

Facility 60 comprises local clustered storage controller 34A having a local storage device 50A storing a local volume 62A which is to be mirrored to a remote volume 62B on a remote storage device 50B of remote clustered storage controller 34B. The mirroring, as well as other communication between the local and the remote clustered storage controllers, may be performed over a wide area network (WAN) 64 via HBAs 66A and 66B in the two clustered storage controllers. While the example shown in FIG. 2 shows facility 60 comprising the local and the remote clustered storage controllers, other types of storage systems are considered to be within the spirit and scope of the present invention.

Local module 36A comprises a local processor 68A and a local memory 70A. In some embodiments, local processor 68A may store local volume 62A in a plurality of local regions 72A which the local storage controller can reference via local snapshots 74A. Likewise, remote module 36B comprises a remote processor 68B and a remote memory 70B. In some embodiments, remote processor 68B may store remote volume 62B in a plurality of remote regions 72B which the remote storage controller can reference via remote snapshots 74B.

As described supra, during snapshot-based (asynchronous mirroring, local processor 68A defines, for local volume 62A, a most recent snapshot (MRS) 74A and compares the MRS to a last replicated snapshot (LRS) 74A for the local volume. Local processor 68A can then convey any differences detected between the MRS and the LRS to remote volume 62B.

Upon conveying the differences, local processor 68A can delete LRS, and the MRS becomes the new LRS. Additionally, upon receiving and storing the differences to remote volume 62B, remote processor 68B can define remote snapshot 74B that is also referred to as a last consistent snapshot (LCS) 74B. In asynchronous mirroring, the LRS and the LCS represent the most recent synchronization of the local and the remote volumes.

As described hereinbelow, local processor 68A may define a bitmap 76 in local memory 70A. In some embodiments, each bit in bitmap 76 corresponds to one of local regions 72A, and indicates whether or not any data has been written to the corresponding local region.

Storage devices 50A and 50B typically comprise a combination of high capacity hard disk drives and solid state disk drives. In some embodiments each of the storage devices may comprise a logical disk. In storage systems implementing the Small Computer System Interface (SCSI) protocol, the logical disks are typically referred to as logical units, or LUNs. While each LUN is typically addressed as a single logical unit, the LUN typically comprises a combination of high capacity hard disk drives and/or solid state disk drives.

Processors 68A and 68B typically comprise general-purpose computers, which are programmed in software to carry out the functions described herein. The software may be downloaded to local module 36A and remote module 36B in electronic form, over a network, for example, or it may be provided on non-transitory tangible media, such as optical, magnetic or electronic memory media. Alternatively, some or all of the functions of processors 68A and 68B may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more comp uter readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Remote Volume Initialization

Figure 3:
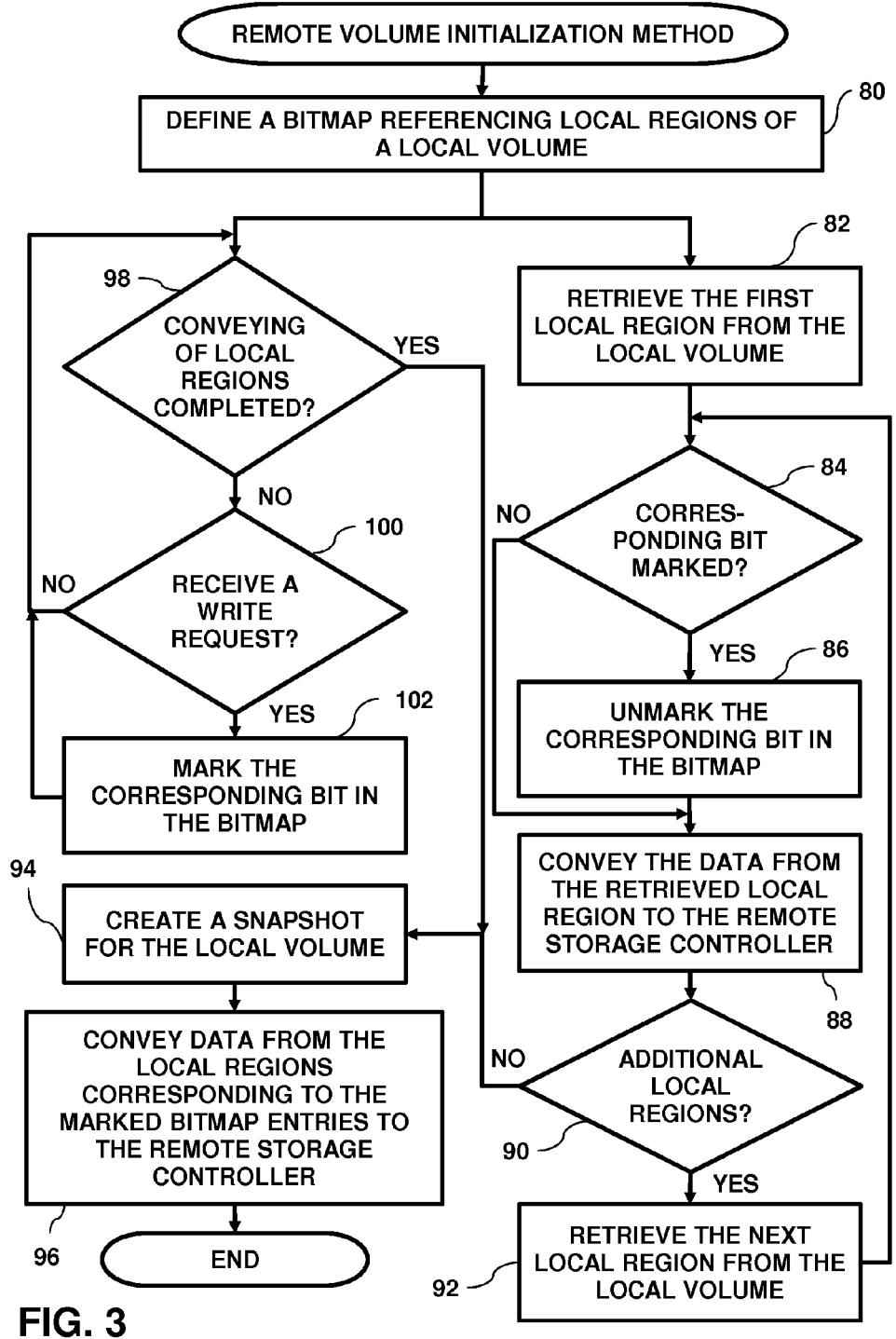
FIG. 3 is a flow diagram that schematically illustrates a method of initializing a remote volume, in accordance with an embodiment of the present invention.

FIG. 3 is a flow diagram that schematically illustrates a method of initializing remote volume 62A for asynchronous mirroring, in accordance with an embodiment of the present invention. In a definition step 80, local processor 68A defines bitmap 76 for a given local snapshot 74A. As described supra, each local region 72A has a corresponding bit (also referred to as an entry) in bitmap 76. Upon defining bitmap 76, local processor 68A initializes all the bits in the bitmap (e.g., to "0") so that all the bits in the bitmap indicate that no local regions 72A have been updated since the start of the initialization.

In the flow diagram shown in FIG. 3, local processor 68A performs steps 82-92 and steps 98-102 concurrently. As explained hereinbelow, in steps 98-102, upon receiving a request to write data (i.e., update) a given local region 72A in local volume 62A, local processor 68A marks the associated bit in bitmap 76, and in steps 82-92, the local processor sequentially conveys local regions 72A on local volume 62A to corresponding remote regions 72B on remote volume 62B. In the embodiments described herein, to mark a given bit in bitmap 76, local processor 68A may store a "1" (i.e., a value) to the given bit. Likewise, to unmark a given bit in bitmap 76, local processor 68A may store "0" to the given bit.

In a first retrieval step 82, local processor 68A retrieves first data from the first local region 72A from local volume 62A. In a first comparison step 84, if the corresponding bit in bitmap 76 is marked, thereby indicating that the retrieved local region was updated subsequent to step 80, then in an unmarking step 86, local processor 68A unmarks the corresponding bit in bitmap 76. In a first conveying step 88, local processor 68A conveys the retrieved first data to remote storage controller 34B.

Returning to first comparison step 84, if the corresponding bit in bitmap 76 indicates the retrieved local region has not been updated (i.e., subsequent to step 80), then the method continues with step 88.

In a second comparison step 90, if there are additional local regions 72A in local volume 62A, then in a second retrieval step 92, local processor 68A retrieves first data from the next local region 72A from local volume 62A, and the method continues with step 84. If there are no additional local regions 72A to be conveyed to the remote clustered storage controller, then in a snapshot creation step 94, local processor 68A creates a local snapshot 74A. The created local snapshot comprises the "most recent" snapshot for the local storage controller, as described supra.

Finally, in a second conveying step 96, subsequent to creating local snapshot 74A, local processor 68A conveys second data from the local regions associated with the marked entries in bitmap 76 (also referred to as the updated local regions) to remote storage controller 34B, and the method ends.

While the flow diagram in FIG. 3 describes operations performed by local processor 68A on local storage controller 34A, upon receiving the conveyed first data from the local storage controller (i.e., in step 88), remote processor 68B stores the first data to corresponding remote regions 72B. Additionally, after receiving the conveyed second data conveyed from the local storage controller (i.e., in step 96), and storing the received second to corresponding remote regions 72B, remote processor 68B may create a remote snapshot 74B, i.e., the LCS referencing the remote regions of the remote volume.

As described supra, while conveying local regions 72A to remote clustered storage controller 34B, local processor 68A simultaneously updates bitmap 76 upon receiving a write request for local volume 62A. In a third comparison step 98, if local processor 68A has not completed conveying local regions 72A to remote clustered storage controller 34B (as described supra in steps 82-92), then in a fourth comparison step 100, if the local processor receives a write request to update a given local region 72A, then in a marking step 102, the local processor marks a corresponding bit (i.e., corresponding to the given local region) in bitmap 76, thereby marking (i.e. indicating) that the given local region has been updated, and the method continues with step 98.

Returning to step 100, if local processor 68A does not receive a write request, then the method continues with step 98. Returning to step 98, if local processor 68A has completed the conveying of local regions 72A to remote clustered storage controller 34B, then the method continues with step 94.

In steps 84-88 of the flow diagram described hereinabove, if the corresponding bit in bitmap 76 is marked to indicate that a given local region 72A has been updated, local processor 68A conveys data from the given local region 72A, and unmarks the corresponding bit. In an alternative embodiment, local processor 68A can check bitmap 76 prior to retrieving a given local region 72A in steps 82 and 92, and skip the steps of retrieving the local region, unmarking the corresponding bit in the bitmap and conveying data from the retrieved local region to remote clustered storage controller 34B. In this alternative embodiment, local processor 68A conveys, in step 102, second data from all local regions 72A corresponding to the marked bits in bitmap 76.

While the embodiments described herein utilize bitmap 76 to indicate any updates to local volume 62A, other methods of indicating updates to the local volume are considered to be within the spirit and scope of the present invention. For example, in step 80, local processor 68A can store the current time to a time threshold, and in step 84, the local processor can "mark" a given local region 72A upon identifying that the given local region's timestamp has a later time than the time threshold. In some embodiments, as an alternative to bitmap 76, local processor 68A can track the updated regions using other types of static or dynamic data structures. For example, local processor 68A can configure bitmap 76 as a dynamically allocated linked list referencing the updated regions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
conveying first data from local regions of a local volume of a local storage system to a remote storage system having a remote volume with remote regions in a one-to-one correspondence with the local regions;
receiving, while conveying the first data, a request to update a given local region, and marking the given local region;
creating, subsequent to conveying the first data, a local snapshot referencing the local regions; and
subsequent to creating the local snapshot, conveying second data from the marked given local region to the remote storage system.

2. The method according to claim 1, and comprising skipping the conveying of the first data from the given local region upon detecting that the given local region is marked.

3. The method according to claim 1, and comprising unmarking the given local region upon conveying the first data from the given local region.

4. The method according to claim 1, and comprising defining, prior to conveying the first data, a bitmap, wherein each of the local regions has a corresponding bit in the bitmap.

5. The method according to claim 4, wherein marking the given local region comprises storing a value to the corresponding bit in the bitmap.

6. The method according to claim 1, and comprising storing, prior to conveying the first data, a current time to a time threshold, and wherein marking the given local region comprises identifying a timestamp for the given local region having a later time than the time threshold.

7. A storage facility, comprising:
a local volume having local regions;
a remote volume having remote regions in a one-to-one correspondence with the local regions; and
a local processor configured to convey first data from the local regions to the corresponding remote regions, to receive, while conveying the first data, a request to update a given local region, and to mark the given local region, to create, subsequent to conveying the first data, a local snapshot referencing the local regions and to convey, subsequent to creating the local snapshot, second data from the marked given local region to a remote storage system.

8. The method according to claim 7, and comprising upon receiving and storing the first and second data to the corresponding remote regions, creating a remote snapshot referencing the remote regions.

9. The storage facility according to claim 8, wherein the local processor is configured to skip the conveying of the first data from the given local region upon detecting that the given local region is marked.

10. The storage facility according to claim 8, wherein the local processor is configured to unmark the given local region upon conveying the first data from the given local region.

11. The storage facility according to claim 8, wherein the local processor is configured to define, prior to conveying the first data, a bitmap, wherein each of the local regions has a corresponding bit in the bitmap.

12. The storage facility according to claim 11, wherein the local processor is configured to mark the given local region by storing a value to the corresponding bit in the bitmap.

13. The storage facility according to claim 8, wherein the local processor is configured to store, prior to conveying the first data, a current time to a time threshold, and wherein the local processor is configured to mark the given local region by identifying a timestamp for the given local region having a later time than the time threshold.

14. The storage facility according to claim 8, and comprising a remote processor configured to, upon receiving and storing the received first and second data to the corresponding remote regions, to create a remote snapshot referencing the remote regions.

15. A computer program product, the computer program product comprising:
a non-transitory computer readable storage medium having computer readable program code embodied therewith, the computer readable program code comprising:
computer readable program code configured to convey first data from local regions of a local volume of a local storage system to a remote storage system having a remote volume with remote regions in a one-to-one correspondence with the local regions;
computer readable program code configured to receive, while conveying the first data, a request to update a given local region, and to mark the given local region;
computer readable program code configured to create, subsequent to conveying the first data, a local snapshot referencing the local regions; and
computer readable program code configured to convey, subsequent to creating the local snapshot, second data from the marked given local region to the remote storage system.

16. The computer program product according to claim 15, and comprising computer readable program code configured to skip the conveying of the first data from the given local region upon detecting that the given local region is marked.

17. The computer program product according to claim 15, and comprising computer readable program code configured to unmark the given local region upon conveying the first data from the given local region.

18. The computer program product according to claim 15, and comprising computer readable program code configured to define, prior to conveying the first data, a bitmap, wherein each of the local regions has a corresponding bit in the bitmap.

19. The computer program product according to claim 18, wherein the computer readable program code is configured to mark the given local region by storing a value to the corresponding bit in the bitmap.

20. The computer program product according to claim 15, and comprising computer readable program code configured to store, prior to conveying the first data, a current time to a time threshold, and wherein marking the given local region comprises identifying a timestamp for the given local region having a later time than the time threshold.

* * * * *